C. SHAPLEY.
CENTRIFUGAL FILTER FOR CYANID PLANTS.
APPLICATION FILED MAR. 30, 1909.
959,173.
Patented May 24, 1910.
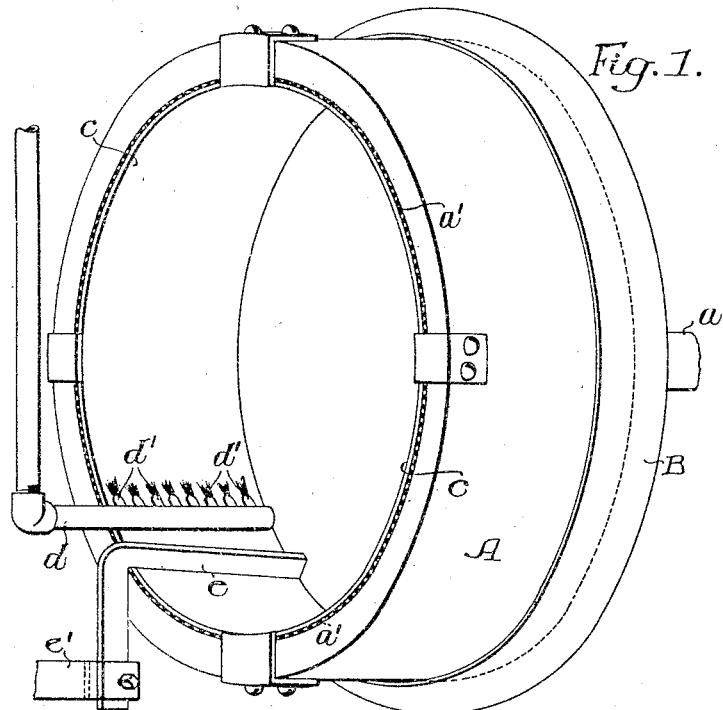
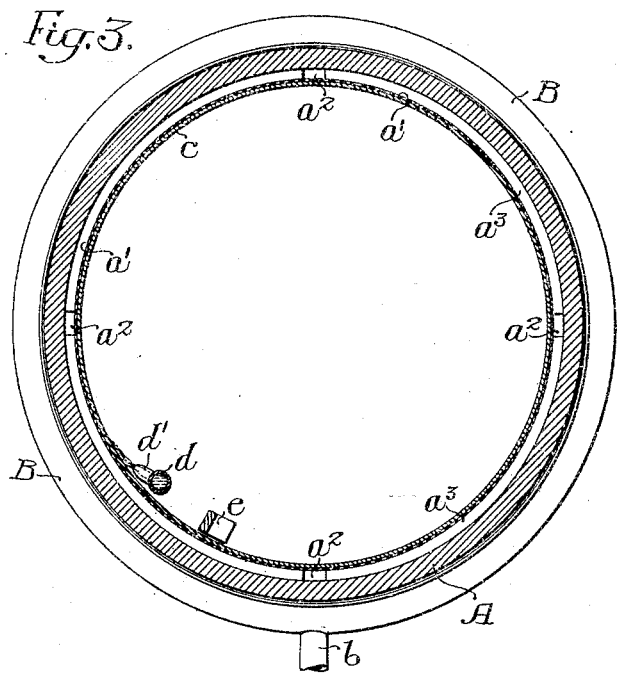
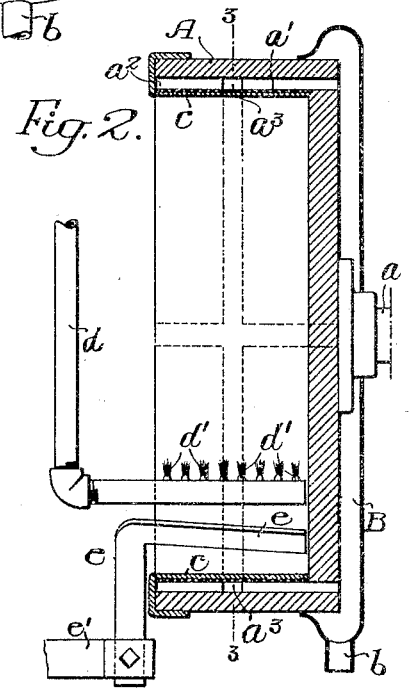
Witnesses:
Willa A. Burrowes
Walker P. Pullinger
Inventor:
Cooper Shapley.
by his Attorneys
Howson & Howson

UNITED STATES PATENT OFFICE.

COOPER SHAPLEY, OF GUANAJUATO, MEXICO.

CENTRIFUGAL FILTER FOR CYANID PLANTS.

959,173. Specification of Letters Patent. Patented May 24, 1910.

Application filed March 30, 1909. Serial No. 486,838.

*To all whom it may concern:*

Be it known that I, COOPER SHAPLEY, a citizen of the United States, residing in Guanajuato, State of Guanajuato, Mexico, have invented certain Improvements in Centrifugal Filters for Cyanid Plants, of which the following is a specification.

One object of my invention is to provide a form of filter particularly adapted to separate the solid material from the muddy or dirty cyanid solution in order that this, when passed to precipitating tanks may be perfectly clear; it being a well known fact that when in a muddy or dirty condition the solution will not properly precipitate the precious metals carried by it.

It is further desired to provide a filter of the centrifugal type particularly adapted for the treatment of muddy or dirty solution of the above noted class and equip this with means whereby it is available for continuous operation.

These and other advantageous ends I secure as hereinafter set forth, reference being had to the accompanying drawings, in which:—

Figure 1, is a perspective view of my improved filter; Fig. 2, is a vertical section of the filter shown in Fig. 1, and Fig. 3, is a vertical section on the line 3—3, Fig. 2.

In the above drawings A represents a relatively heavy cylinder preferably of cast iron, open at one end and either closed at the other end or provided with spokes for the reception of a driving shaft $a$ which, it will be understood, is mounted in any suitable bearings and is connected to any source of power.

Within the cylinder A I mount a basket $a'$ of wire screen of medium mesh, and it will be understood that in the inner surfaces of the cylinder are provided a number of passages $a^2$ extending parallel to the axis of said cylinder, as well as other passages $a^3$ extending circumferentially of said cylinder and communicating with said first passages. While it is obvious that liquid may be led from said passages in any desired way without affecting the nature or scope of this invention, I have illustrated them as opening at the shaft end of the cylinder and discharging into a head B of sheet metal having an outlet $b$ leading to any receptacle or to the precipitation tanks. Within the screen $a'$ I mount a layer of heavy canvas or bagging $c$ which constitutes the filter proper, though it will be understood that other filtering material may be employed without departing from my invention.

Extending into the cylinder in a line parallel with its axis and adjacent to its curved surface is a liquid discharge pipe $d$ connected to a tank or other container of the liquid to be filtered and provided with a series of nozzles $d'$ extending at right angles to its length so as to deliver liquid to the body of canvas or other filtering medium, practically parallel therewith or at a slight angle thereto.

In order to remove the accumulation of solid material which gathers on the surface of the canvas, I provide a scraper $e$ adjustably mounted upon any convenient support $e'$ so that it may be supported over the canvas or other filtering surface. The active portion of the scraper preferably extends at a slight angle to a line of the surface of the cylinder so that the material gradually collecting against it may be forced toward the open end of the cylinder and discharged.

Under operating conditions the liquid to be filtered is delivered to the pipe $d$ and issues from the nozzles $d'$, while the cylinder A is turned through its shaft $a$ at such a speed that the surface velocity of the canvas filter and the velocity of the jets of liquid are practically the same, with the object of avoiding any splashing of the liquid. Under the centrifugal action due to the revolution of the cylinder, the liquid is forced through the canvas, leaving its solid particles on the outer surface thereof, and flowing through the passages $a^3$ and $a^2$ until it finally reaches the head B and flows away through the outlet pipe $b$ to the precipitation or storage tanks.

If the liquids carry any considerable amount of clay or clayey material, the scraper $e$ must be adjusted so as to lie relatively close to the surface of the canvas $c$, since the liquid being treated cannot pass through a thick layer of such substance. The solid material is continuously delivered from the open end of the cylinder, since it gradually accumulates on the scraper, and owing to the inclination of this latter is gradually moved longitudinally of the cylinder until it falls out of the same.

From the above description it will be seen that the operation of my improved filter is practically continuous, while the device as a whole is of a relatively simple construction, easily operated and maintained in working condition.

It is of course obvious that if desired, the cylinder may be operated in other positions than with its axis horizontal without departing from my invention.

I claim:

1. The combination of a rotatable cylinder having one end open, means for supporting said cylinder with its axis horizontal, a conduit at the open end of the cylinder for delivering liquid to the interior thereof, a scraper acting within the cylinder for removing solid material, filtering material in the cylinder, there being liquid collecting passages in the walls of said cylinder placed to collect liquid passing through said filtering material, and a liquid collecting casing placed to receive liquid flowing from said passages.

2. The combination of a rotary cylinder having a cylindrical lining of filtering material, a scraper mounted to remove the solid material from the surface of said filtering material, with means for delivering liquid to be filtered to said cylinder, said scraper extending at an angle to the axis of the cylinder across the surface of the filtering material.

3. The combination of a rotary cylinder having a lining of filtering material, a liquid discharge pipe extending into said cylinder adjacent to one side thereof, said pipe having a series of openings placed to discharge liquid substantially in the direction of rotation of the cylinder, with means for continuously removing solid material from the cylinder.

4. The combination of a rotary cylinder having liquid conveying passages in its inner surface, a body of filtering material mounted upon said cylindrical surface of the cylinder, means for collecting liquid from said passages, and a scraper mounted to continuously remove solid material from the surface of the filtering material, with means for delivering liquid to be filtered into the cylinder.

In testimony whereof, I have signed my name to this specification, in the presence of two subscribing witnesses.

COOPER SHAPLEY.

Witnesses:
WILLIAM H. SACKETT,
LOUIS KAPROSO.